Figure 1:
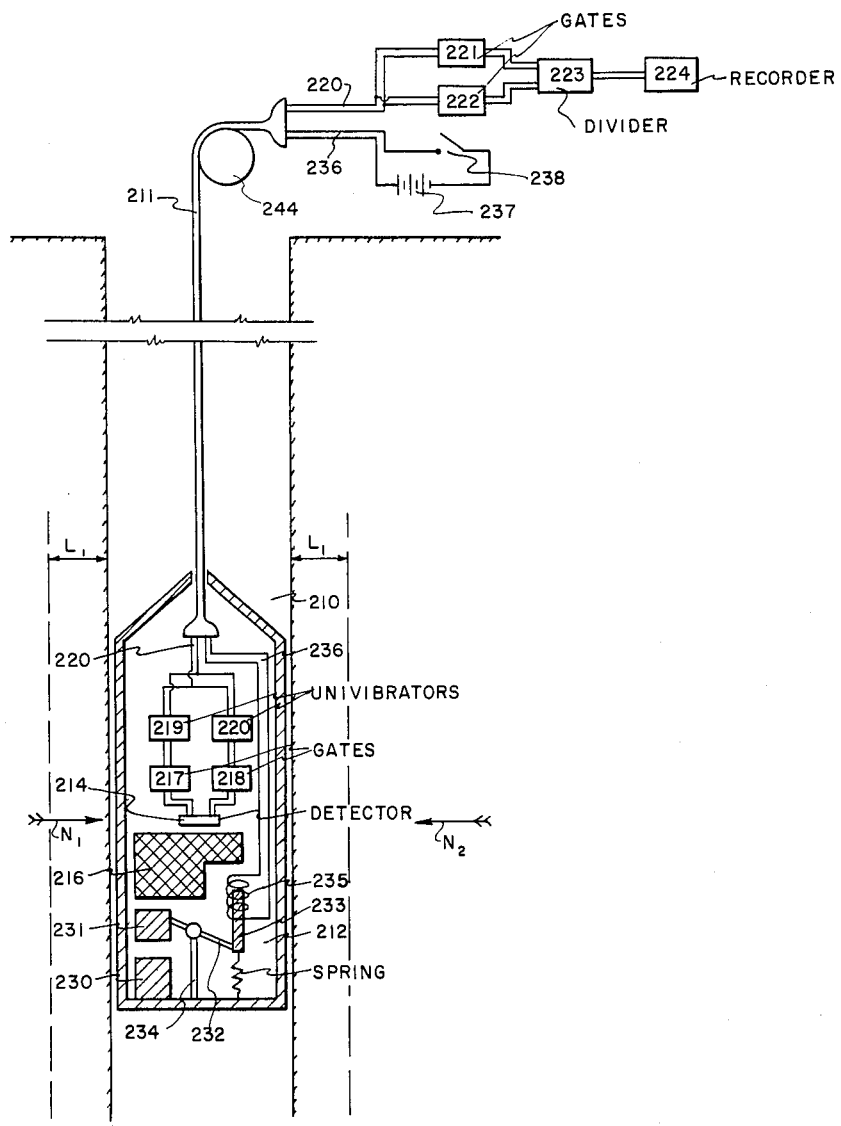

Feb. 15, 1966     S. A. SCHERBATSKOY     3,235,730

NEUTRON-GAMMA WELL-LOGGING APPARATUS

Original Filed Dec. 22, 1955     2 Sheets-Sheet 1

INVENTOR.

Serge A. Scherbatskoy

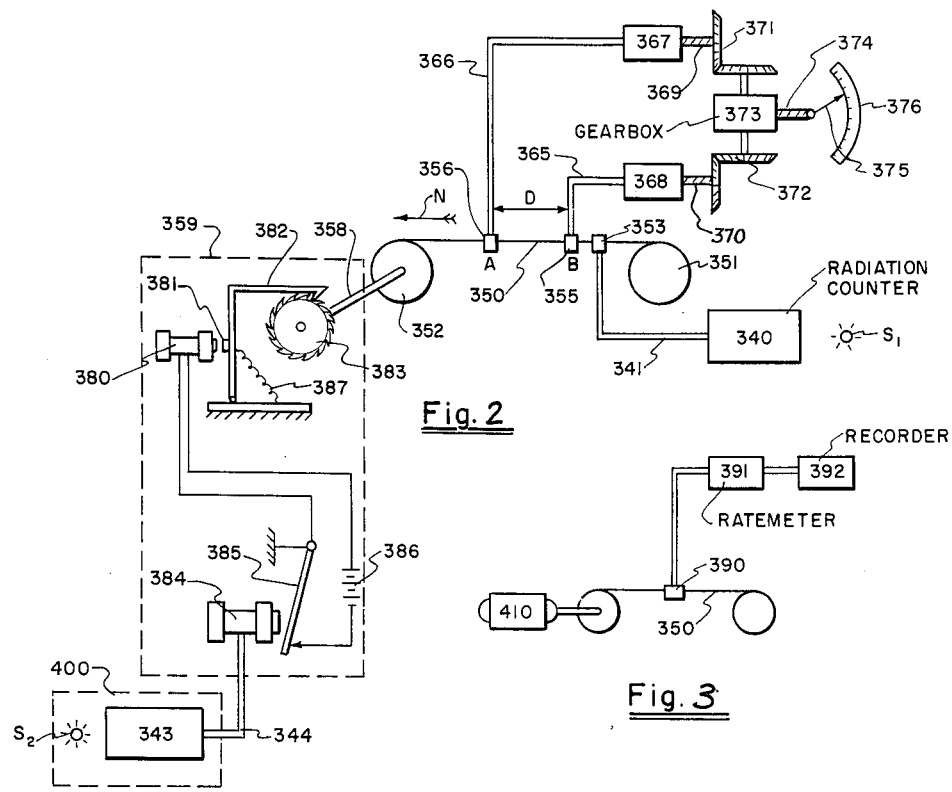

3,235,730
NEUTRON-GAMMA WELL-LOGGING
APPARATUS
Serge A. Scherbatskoy, 804 Wright Bldg., Tulsa 3, Okla.
Original application Dec. 22, 1955, Ser. No. 554,718, now Patent No. 2,984,745, dated May 16, 1961. Divided and this application Apr. 20, 1961, Ser. No. 104,374
2 Claims. (Cl. 250—83.3)

This invention relates to apparatus for logging bore holes by radioactivity detection; particularly, it concerns a system in which electric pulses representing two different classes of detected radiation are compared and the quotient of their repetition rates is derived, thus providing an indication representative of the relative field intensities of the two classes of detected radiation.

This specification is a division of my copending patent application Serial No. 554,718, filed December 22, 1955, now U.S. Patent No. 2,984,745.

An object of my invention is to provide a logging apparatus for determining the character of formations adjoining the walls of a bore hole, wherein such formations are bombarded by neutrons from a source carried within the logging instrument and gamma rays returning to the bore hole from such formations are detected and analyzed.

The present invention is of particular interest in applications wherein two different classes of radiation are separately detected and compared, such classes, for example, comprising gamma rays of energy levels below a predetermined value and other gamma rays characterized by energy levels in some different portion of the energy spectrum.

A further object of my invention is to provide a novel and improved means for continuously comparing the field intensities of two such separate classes of detected radiation and obtaining an indication representative of the quotient or ratio of such field intensities.

Typical embodiments of my invention are illustrated in the appended drawing, of which: FIG. 1 is a diagrammatic showing of both the sub-surface and surface components of a bore hole-logging apparatus. FIG. 2 is a diagrammatic representation of a ratio-sensing unit or "divider" of a type which may be used in the FIG. 1 embodiment of the invention. FIGS. 3, 4a, and 4b are diagrammatic representations of certain apparatus components which may be used alternatively to portions of the apparatus disclosed in FIG. 2.

In FIG. 1, numeral 210 designates a bore hole and numeral 244 a hoist mechanism for lowering and raising a well-logging instrument in the bore hole. The chart of the recorder 224 is driven in synchronism with the hoist mechanism 244 in a manner well known in the art to provide a record as a function of depth, or, if desired, it may be driven by a clock mechanism so as to make a record as a function of time. Cable 211 lowers the well-logging instrument, which comprises a source of neutrons 212 and a gamma-ray detector 214 of the scintillation counter type, said detector being separated from the source by means of a suitable shield 216.

The detector 214 is directional and is arranged to receive incident rays along the radial directions $N_1$ and $N_2$. Its output is fed simultaneously to gate networks 217 and 218, the network 217 being adapted to transmit pulses having amplitude above a certain threshold value N and the network 218 being adapted to transmit pulses having amplitude below said threshold values N. The outputs of networks 217 and 218 are respectively applied to univibrators 219 and 220. The univibrator 219 generates pulses of uniform magnitude $M_1$, each of said pulses being coincident with the corresponding pulses in the output of the network 217. Similarly, the univibrator 220 generates pulses of uniform magnitude $M_2$, said pulses being coincident with the corresponding pulse in the output of the network 218. Both univibrator outputs are transmitted to the top of the hole by means of leads 220 within the cable 211 and are applied to suitable gate networks 221 and 222. It should be noted that the values $M_1$ and $M_2$ are not directly related to the magnitudes of the input pulses applied to the networks 217 and 218, and that it is desirable that the value $M_1$ differ considerably from $M_2$. It is well known that the two groups of pulses having magnitudes $M_1$ and $M_2$ that are applied at the input end of the leads 220 undergo considerable distortion as they travel along the cable. However, since there is a considerable margin of difference between the magnitudes of these pulses, there is no occurrence of crossfeeding. The group of pulses derived from the output of the univibrator 219 and the group of pulses derived from the output of the univibrator 220 are still separable one from the other in spite of amplitude distortion that occured during the transmission over the cable. Thus the first group is comprised within the amplitude range $M_1 \pm \Delta M_1$ and the second group is comprised within the amplitude range $M_2 \pm \Delta M_2$ where the values $\Delta M_1$ and $\Delta M_2$ represent the effects of amplitude distortion by the cable. Furthermore, if $M_1 > M_2$ we have $$M_1 - \Delta M_1 > M_2 + \Delta M_2$$

i.e., the two groups are separate and are separated by means of the gates 221 and 222. In order to accomplish such separation, it is necessary that the gate 221 transmit pulses within the range $M_1 \pm \Delta M_1$ and the gate 222 transmit pulses within the range $M_2 \pm \Delta M_2$. The output of the gate 221 associated with the low-energy quanta detected by the counter 214 may represent formation characteristics that are adjacent the wall of the bore hole within relatively short distances from the detector, while the output of the gate 222 is associated with high-energy quanta detected by the counter 214 and may represent the formation characteristics at greater distances inward from the bore-hole wall. (For a full discussion of the theory underlying this type of well logging, see my copending application Serial No. 554,718, filed December 22, 1955.)

In some instances, particularly in the study of the invasion of the bore-hole fluids into the formation, it is desirable to measure the ratio of the outputs of the gates 221 and 222, and with this purpose in mind the output of gates 221 and 222 are applied to a divider 223 which provides across its output leads current impulses that occur at a rate expressed by the quotient of the rates of impulses derived from the gates 221 and 222. The output of the divider is applied to a suitable recorder 224.

The pulsed neutron source 212 consists essentially of two slugs of uranium 235 or plutonium 239 designated as 230 and 231 which, under normal conditions, are spaced one from the other at a sufficiently large distance so as to substantially prevent spontaneous fission. The slug 230 is stationary with respect to the bottom of the housing, whereas the slug 231 is attached to the end of an arm 232, the other end of said arm being adapted to support a ferromagnetic rod 233. The arm 232 is rotatable on a support 234, thus forming a lever. The rod 233 cooperates with a solenoid 235. Thus when an electric current is made to pass through the solenoid 235, it attracts the rod 233 which in turn turns the arm 232 and decreases the distance between the two uranium slugs 230 and 231. The terminals of the solenoid 235 are connected to the leads 236 which extend through the cable 211 to the top of the bore hole and are connected to a battery 237 in series with a switch 238. Thus by closing the switch 238, we energize the solenoid 235 which actuates the arm 232 of the lever and causes the slug 231 to be displaced downward to the neighborhood of the slug 230. The system is then a little above critical. The fission rate rises extremely rapidly; the uranium heats and expands, thus dropping the reactivity enough to terminate the fission burst. Thus a potentially run-away burst is stopped by thermal action. In a typical burst of this type, the initial rise in fission is exponential with a period of about 15 milliseconds and continues to a maximum power level of nearly $10^9$ watts. The burst is about 50 milliseconds long and the energy developed is that of $10^{16}$ fissions or about 100 watt-hours.

The divider designated diagrammatically by the block 223 in FIG. 1 may be of the type shown in FIG. 2. There I have shown diagrammatically an arrangement for indicating and recording the ratio of the radiation intensities of two sources designated as $S_1$ and $S_2$. The source $S_1$ is placed adjacent a standard Geiger counter or scintillation counter 340 which produces across its output leads 341 a succession of electrical pulses, the rate of occurrence of which represents the intensity of the source $S_1$. Similarly, the source $S_2$ is placed adjacent a standard Geiger counter or scintillation counter 343 which produces across its output leads 344 a succession of pulses, the rate of occurrence of which represents the intensity of the source $S_2$. (It will be understood, of course, that if the FIG. 2 apparatus is used as the divider 223 in the FIG. 1 system, the leads 341 and 344 will be connected respectively to the outputs of gates 221 and 222.)

The divider mechanism of FIG. 2 employs a recorder-reproducer system that comprises a spool 352, arranged to move an elongated record medium, such as a magnetic recorder wire 350, in the direction indicated by the arrow N from spool 351. The wire has associated with it a magnetic recording head 353 arranged to produce a magnetic mark or impression on the record wire each time an electric impulse is applied to the input leads 341 of the recording head. These pulses are subsequently reproduced by reproducer heads 355 and 356 associated with said magnetic wire and spaced one from the other by a certain fixed distance D. The driving spool 352 is mounted on a shaft 358, said shaft being driven by an electromechanical transducer comprised within a dashed block 359. This transducer is provided with input leads 344 and is adapted to rotate the shaft 358 in such a manner that the angular displacement of said shaft from any initial instant of time is proportional to the total number of impulses applied to the input leads 344 since said instant of time. The leads 344 are connected to the output of a Geiger or scintillation counter 343 placed adjacent the source $S_2$.

Since the lineal motion of the wire 350 is governed by the repetition rate of the impulses derived from source $S_2$ and the recording head 355 forms a magnetic impression on the wire 350 for each impulse derived from source $S_1$, the number of such impressions per unit length of the wire 350 is proportional to the ratio of the respective impulse rates from the two sources, and hence to the ratio of their respective field intensities.

The output leads 365 and 366 of the reproducer heads 355 and 356 are applied to electromechanical transducers 367 and 368, respectively. Each of the transducers 367, 368 is similar to the one comprised within the dashed rectangle 359. Thus the transducer 367 drives the shaft 369 in uniform angular increments in response to pulses applied to leads 366 in such a manner that each increment corresponds to one pulse, and thus the total angular displacement of the shaft 369 represents the number of pulses across the leads 366. Similarly, the total angular displacement of the shaft 370 represents the number of pulses across the leads 365. The shaft 369 and shaft 370 are in turn applied through respective gear sets 371 and 372 to a differential gear box 373. The output shaft 374 of the differential gear box is provided with an indicator 375 arranged for movement over a circular scale, indicated in part as 376. The angular displacement of shaft 374 from an initial position represents or is proportional to the difference between the angular displacements of shafts 369 and 370, and hence represents the ratio of the number of pulses obtained from the source $S_1$ to the number of impulses obtained from the source $S_2$. Shaft 374 and indicator 375 may if desired be arranged to operate the recorder pen of a strip chart recorder.

Instead of a magnetic wire for the recording medium, recording tapes and similar media may be used, and various well-known arrangements such as a capstan drive can be used to maintain precise relationship between the angular displacement of shaft 358 and the lineal displacement of the wire or tape member 350. Also, other types of apparatus can be used, such, for example, as a paper strip adapted to be perforated and having associated with it devices for producing impulses in response to the perforation.

The electromechanical transducer of the type designated by blocks 359, 367, and 368 comprises an electromagnet 380 which cooperates with an armature 381 connected to a member 382 arranged to actuate a ratchet wheel 383. Whenever the electromagnet 380 is energized it attracts armature 381, thereby rotating ratchet wheel 383. Whenever a pulse occurs at the output leads 344 of the counter 343 an electromagnet 384 is energized, thus causing opening of a switch 385 in the circuit comprising a battery 386 and supplying current to electromagnet 380 and thereby allowing a spring 387 to retract rod 382 and cause it to engage a succeeding tooth of ratchet wheel 383. After an interval of time, the pulse applied to electromagnet 384 disappears, and thus electromagnet 384 drops the switch 385 which again closes the circuit of battery 386 and the latter energizes electromagnet 380. Electromagnet 380 then attracts armature 381 and moves ratchet wheel 383. It should be noted that the ratchet wheel 383 drives by means of the shaft 358 the spool 352. Consequently, the angular displacement of the driving spool 352 or the linear displacement of the magnetic wire 350 is proportional to the number of impulses obtained from the output leads 344.

In order to understand better the operation of this arrangement, assume a certain time interval T during which the source $S_2$ does not vary in intensity and furthermore, the radiation quanta emitted by this source are uniformly distributed in time, i.e., they succeed each other after definite and equal time increments. Thus we obtain across the leads 344 a succession of pulses, each pulse being separated from its preceding pulse by the same time increment. Then the shaft 358 moves by uniform angular increments that are equally spaced in time. Also the wire 350 moves by uniform linear increments equally spaced in time, each of said increments being coincident with the occurrence of the pulse at the output leads 344 of the counter. It is apparent that the mean linear velocity V of the wire during said time interval T is proportional to the rate occurrence of pulses at the output leads of the counter 343. As the wire 350 moves, it receives magnetic impressions from the head 353, said impressions being coincident with the impulses at the output leads 341. The total linear displacement of the wire during the time interval T is $L=VT$. It is apparent that the number of magnetic impressions made on the segment of wire of the length L during said time T is proportional to the rate of occurrence of pulses at the leads 341 and is inversely proportional to the mean velocity V, i.e., it is inversely proportional to the rate of occurrence of pulses at the output of the counter 343. Thus the number of magnetic impressions made represents the ratio or quotient of rate of impulses derived from the counter 340 and the rate of impulses derived from the counter 343 during the interval T.

It is our purpose to measure the above ratio, i.e., to determine the number of magnetic impressions made on a segment of wire of length L. This is accomplished by arranging the magnetic reproducers 355 and 356 so as to be distant one from the other by the length D. The pulses derived from the reproducer 356 actuate the transducer 367 which in turn rotates the shaft 369 in such a manner that the total angular displacement of said shaft represents the total number of magnetic impressions made on a length of wire that is compressed between a certain initial point (corresponding to the beginning of recording) and the point A at which the head 356 is positioned. Similarly, the pulses derived from the reproducer 355 actuate the transducer 368 which in turn rotates the shaft 370 in such a manner that the total angular displacement of said shaft represents the total number of magnetic impressions made on a length of wire that is comprised between said initial point and the point B at which the head 355 is positioned.

Thus the angular displacement of the shaft 374 is proportional to the difference between the number of impressions from the initial point to the point A and the number of impressions from the initial point to the point B. Consequently, the displacement of the shaft 374 and the indications of the pointer 375 represent the number of impressions made on the wire segment between the points A and B and hence represent the desired quotient of the rate of impulses associated with the source $S_1$ and the rate of impulses associated with the source $S_2$.

The index of the ratio of said two quantities may be obtained in a different manner. For instance, the reproducers 355, 356 and all the equipment associated with said reproducers may be eliminated from the arrangement of FIG. 2, which then acts merely as a recorder. After the recording is completed, the magnetic wire is placed on the reproducer shown in FIG. 3 and driven at a constant speed by the motor 410. Thus we obtain at the output of the reproducer 390 electric impulses having a rate of occurrence representative of the quotient of the rate of occurrence of impulses due to the sources $S_1$ and $S_2$. The pulses from the output of the reproducer 390 are applied to the rate meter 391 which is in turn applied to an indicator 392, and its indication represents the desired quotient.

Another method of obtaining the desired quotient is illustrated in FIG. 4a and FIG. 4b. As shown in FIG. 4a, the impulses detected near the source $S_1$ are recorded on a magnetic tape 393 that is driven at a constant speed by means of the motor 394. After the recording is completed, the tape 393 is put on the reproducer shown in FIG. 4b, driven by a spool 395 that has its shaft applied to an electromechanical transducer 396 similar to transducer 359 already described. The transducer 396 is energized by the impulses detected near the source $S_2$ by the counter 343. Thus we obtain at the output of the reproducer 397 electric impulses having a rate of occurrence representing the quotient of the impulses due to sources $S_1$ and $S_2$. These pulses are applied to a rate meter 398 which is in turn connected to an indicator or recorder 399.

It will be understood that the embodiments of my invention herein shown and described are merely illustrative; the scope of my invention is to be determined primarily with reference to the appended claims.

I claim:

1. Apparatus for bore-hole logging comprising a housing adapted to be received within a bore hole, a neutron source mounted within the housing, radiation detecting means mounted within the housing and spaced away from said neutron source, shield means interposed between said source and said detecting means operative to prevent radiation from said source from impinging directly on said detecting means, means fed by said detecting means operative to develop first and second electric pulses respectively representative of first and second radiations detected by said detecting means, the repetition rate of said first and second pulses being respectively proportional to the field intensities of said first and second radiations, means for transmitting said pulses to the earth's surface, and means comprising an elongated magnetic recording medium, means placed adjacent said medium for recording magnetic impressions thereon, means fed and controlled by said first electric pulses for moving said magnectic medium past said recording means at a rate proportional to the repetition rate of said first electric pulses, means feeding said second electric pulses to said recording means operative to record on said medium magnetic impressions proportional in number to said second electric pulses, and means for developing from said recording medium an indication proportional to the number of magnetic impressions on said medium per unit length thereof.

2. Apparatus according to claim 1 wherein said last-mentioned means comprises a means for moving said magnetic medium at a uniform speed, a reproducing head associated with said medium operative to generate electric pulses responsively to the passage therethrough of magnetic impressions on said medium, and a rate meter fed by the electric pulses from said reproducing head.

References Cited by the Examiner
UNITED STATES PATENTS

| 2,776,378 | 1/1957 | Youmans | 250—83.6 |
| 2,827,572 | 3/1958 | Blanchard | 250—83.6 |
| 2,943,200 | 6/1960 | Rickard | 250—83.3 |
| 2,964,375 | 12/1960 | Suckling | 346—74 |
| 2,971,094 | 2/1961 | Tittle | 250—83.3 |
| 2,975,017 | 3/1961 | Conkey et al. | 346—74 |
| 3,035,174 | 5/1962 | Turner et al. | 250—71.5 X |

RALPH G. NILSON, *Primary Examiner.*

ARTHUR GAUSS, ARCHIE BORCHELT, *Examiners.*